:::: {.columns}
::: {.column}
(12) United States Patent
Ooishi

(54) IMAGE PROCESSING DEVICE, IMAGE PROCESSING METHOD, AND PROGRAM

(71) Applicant: Sony Semiconductor Solutions Corporation, Kanagawa (JP)

(72) Inventor: Noriaki Ooishi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/523,528

(22) PCT Filed: Nov. 13, 2015

(86) PCT No.: PCT/JP2015/082000
§ 371 (c)(1),
(2) Date: May 1, 2017

(87) PCT Pub. No.: WO2016/084631
PCT Pub. Date: Jun. 2, 2016

(65) Prior Publication Data
US 2017/0318258 A1 Nov. 2, 2017

(30) Foreign Application Priority Data
Nov. 27, 2014 (JP) ................ 2014-240053

(51) Int. Cl.
*H04N 7/01* (2006.01)
*G09G 3/20* (2006.01)
*H04N 5/783* (2006.01)

(52) U.S. Cl.
CPC ........... *H04N 7/0127* (2013.01); *G09G 3/20* (2013.01); *H04N 5/783* (2013.01);
(Continued)
:::

::: {.column}
(10) Patent No.: US 10,129,501 B2
(45) Date of Patent: Nov. 13, 2018

(58) Field of Classification Search
CPC ........... G06T 1/20; G06T 15/005; G06T 1/60; G09G 5/363; G09G 3/20;
(Continued)

(56) References Cited

U.S. PATENT DOCUMENTS

2002/0021364 A1* 2/2002 Asada .................... H04N 5/232
348/312
2010/0060752 A1* 3/2010 Tokuyama ............. G07F 17/32
348/240.3
(Continued)

FOREIGN PATENT DOCUMENTS

JP 2007-312006 A 11/2007
JP 2009-177619 A 8/2009
(Continued)

*Primary Examiner* — Abderrahim Merouan
(74) *Attorney, Agent, or Firm* — Michael Best & Friedrich LLP

(57) ABSTRACT

The present disclosure relates to an image processing device, an image processing method, and a program capable of increasing the utility of processing for reducing discontinuity in display of image frames acquired through imaging at different imaging rates.
From image frames including normally imaged frames imaged at a normal imaging rate, and high-rate imaged frames imaged at a rate higher than the normal imaging rate, determination is made on image frames imaged at at least one of the imaging rates to be image frames for which a displaying rate is to be changed. The displaying rate of the image frames determined to be the image frames for which the displaying rate is to be changed is adjusted within a predetermined range from a timing when the imaging rate is switched. The present technology is applicable to an image processing device configured to perform image processing on image frames, for example.

20 Claims, 11 Drawing Sheets
:::
::::

(52) U.S. Cl.
CPC ............ *G09G 2320/0613* (2013.01); *G09G 2320/103* (2013.01); *G09G 2340/0435* (2013.01)

(58) Field of Classification Search
CPC ..... G09G 2320/0613; G09G 2320/103; G09G 2340/0435; G06F 3/14; H04N 7/0127; H04N 5/783
See application file for complete search history.

(56) References Cited

U.S. PATENT DOCUMENTS

| | | | |
|---|---|---|---|
| 2015/0185464 A1* | 7/2015 | Karube | G02B 21/06 348/44 |
| 2015/0243204 A1* | 8/2015 | Park | G09G 3/3688 345/212 |
| 2015/0243220 A1* | 8/2015 | Kim | H01L 27/1225 345/215 |
| 2016/0240565 A1* | 8/2016 | Kim | H01L 27/1251 |

FOREIGN PATENT DOCUMENTS

| | | |
|---|---|---|
| JP | 2010-114757 A | 5/2010 |
| JP | 2011-146847 A | 7/2011 |

* cited by examiner

IMAGE PROCESSING DEVICE, IMAGE PROCESSING METHOD, AND PROGRAM

TECHNICAL FIELD

The present disclosure relates to an image processing device, an image processing method, and a program, and more particularly, to an image processing device, an image processing method, and a program capable of increasing the utility of processing for reducing discontinuity in display of image frames acquired through imaging at different imaging rates.

BACKGROUND ART

Imaging devices capable of switching the imaging rate from a normal rate to a higher rate in taking a moving image have been known. When a sequence of image frames acquired by imaging at different imaging rates in this manner is displayed at regular intervals on a display device, an effect that a scene image at a higher rate is reproduced in slow motion is produced.

At a timing corresponding to switching of the imaging rate, however, visual discontinuity may occur, which may give a feeling of strangeness to a viewer when a moving image is displayed.

In view of the above, Patent Document 1, for example, discloses a method of generating images for recording obtained by gradually changing frame intervals at a boundary of frame rates so that discontinuity will be reduced in the display.

CITATION LIST

Patent Document

Patent Document 1: Japanese Patent Application Laid-Open No. 2010-114757

SUMMARY OF THE INVENTION

Problems to be Solved by the Invention

The reduction of discontinuity by the method disclosed in Patent Document 1, however, is limited to preprocessing in an imaging device. Thus, since the method disclosed in Patent Document 1 cannot be applied to image frames that have already been acquired through imaging at different imaging rates, the method is low in versatility. Furthermore, since the image frames for which the displaying rate is adjusted are limited to high-rate imaged frame, the method is low in flexibility.

Thus, the processes of reducing discontinuity in displaying image frames acquired through imaging at different imaging rates have been low in versatility and flexibility, and there have been demands for a method that is higher in utility.

The present disclosure is made in view of these circumstances, and is aimed at increasing the utility of processing for reducing discontinuity in display of image frames acquired through imaging at different imaging rates.

Solutions to Problems

An image processing device according to an aspect of the present disclosure includes: an image frame determination unit configured to determine, from image frames acquired through imaging at different imaging rates, image frames imaged at at least one of the different imaging rates to be image frames for which a displaying rate is to be changed; and a displaying rate adjustment unit configured to adjust the displaying rate of the image frames, determined to be the image frames for which the displaying rate is to be changed by the image frame determination unit, within a predetermined period from a timing when the imaging rate is switched.

An image processing method or a program according to an aspect of the present disclosure includes: determining, from image frames acquired through imaging at different imaging rates, image frames imaged at at least one of the different imaging rates to be image frames for which a displaying rate is to be changed; and adjusting the displaying rate of the image frames, determined to be the image frames for which the displaying rate is to be changed, within a predetermined period from a timing when the imaging rate is switched.

According to an aspect of the present disclosure, determination is made, determining, from image frames acquired through imaging at different imaging rates, on image frames imaged at at least one of the different imaging rates to be image frames for which a displaying rate is to be changed; and the displaying rate of the image frames, determined to be the image frames for which the displaying rate is to be changed, is adjusted within a predetermined period from a timing when the imaging rate is switched.

Effects of the Invention

According to an aspect of the present disclosure, the utility of processing for reducing discontinuity in display of image frames acquired through imaging at different imaging rates is increased.

MODES FOR CARRYING OUT THE INVENTION

Specific embodiments to which the present technology is applied will now be described in detail with reference to the drawings.

Figure 1:
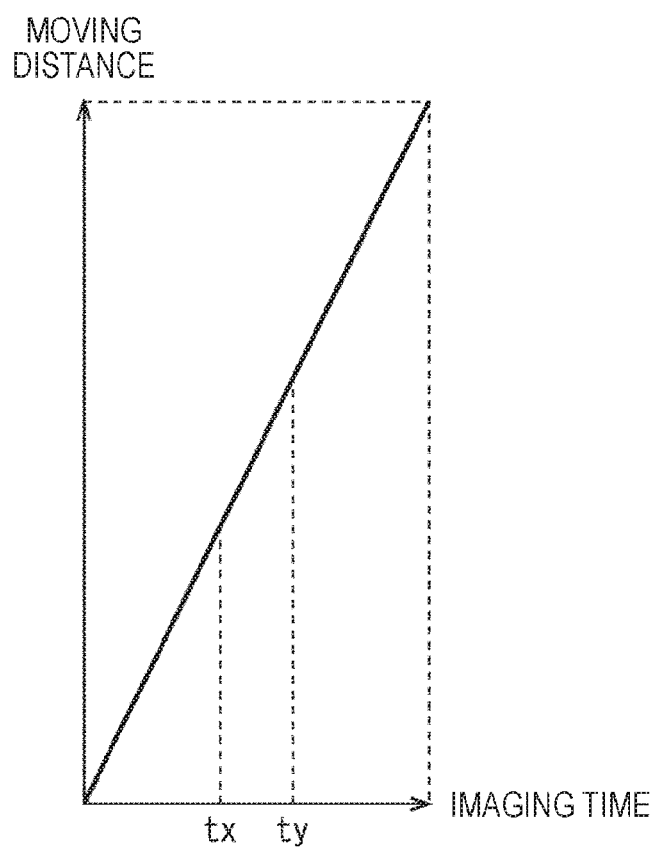
FIG. 1 is a graph in which positions of an object when the object is imaged are plotted.
Figure 2:
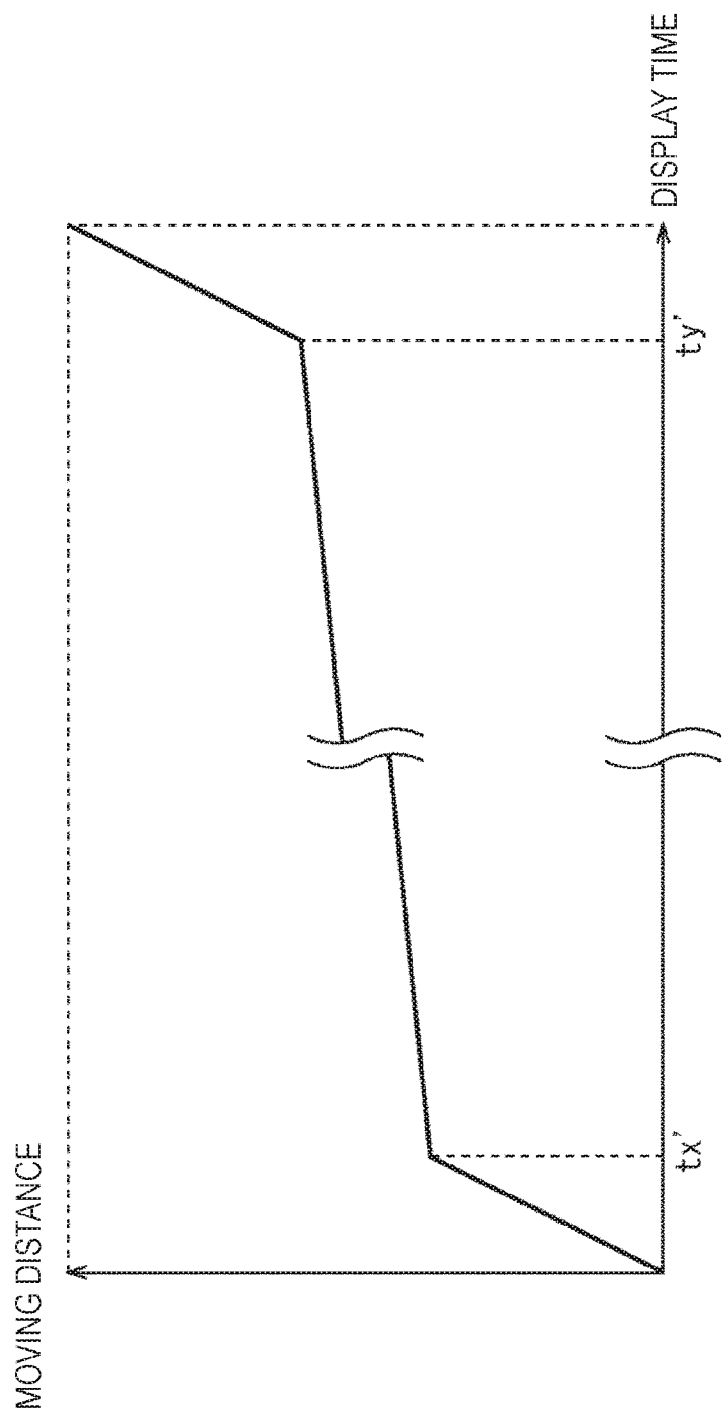
FIG. 2 is a graph in which positions of an object when the object is displayed are plotted.

First, with reference to FIGS. 1 and 2, description will be on an effect that a scene imaged at a higher rate is reproduced in slow motion when a sequence of image frames acquired through imaging at different imaging rates is displayed at regular intervals.

In FIG. 1, positions of an object maintaining a uniform linear motion, which are obtained by imaging of the object at a fixed point, are plotted. In FIG. 1, the horizontal axis represents imaging time, and the vertical axis represents the moving distance of the object.

For example, an imaging device starts imaging at a normal rate (30 fps (frames per second), for example), switches the imaging rate from the normal rate to a high rate (300 fps, for example) at time tx in FIG. 1 and switches the imaging rate from the high rate to the normal rate at time ty in FIG. 1 while imaging.

In FIG. 2, positions of the object obtained by display of an image frame sequence, which is obtained by switching between imaging rates while imaging as shown in FIG. 1, at predetermined intervals (30 fps, for example) on a display device are plotted. In FIG. 2, the horizontal axis represents display time, and the vertical axis represents the moving distance of the object.

As shown in FIG. 2, during a display period from time tx' corresponding to the time tx (FIG. 1) when the imaging rate is switched from the normal rate to the high rate to time ty' corresponding to the time ty (FIG. 1) when the imaging rate is switched from the high rate to the normal rate, the object is displayed as moving slowly. Thus, in display of the image frame sequence, the moving speed (the slope shown in FIG. 2) of the object suddenly changes at time tx' and at time ty', which causes visual discontinuity. This gives a feeling of strangeness to a viewer who views the displayed moving image.

An image processing device to which the present technology is applied is therefore aimed at providing image processing capable of reducing occurrence of such visual discontinuity to increase the utility of the image processing.

Figure 3:
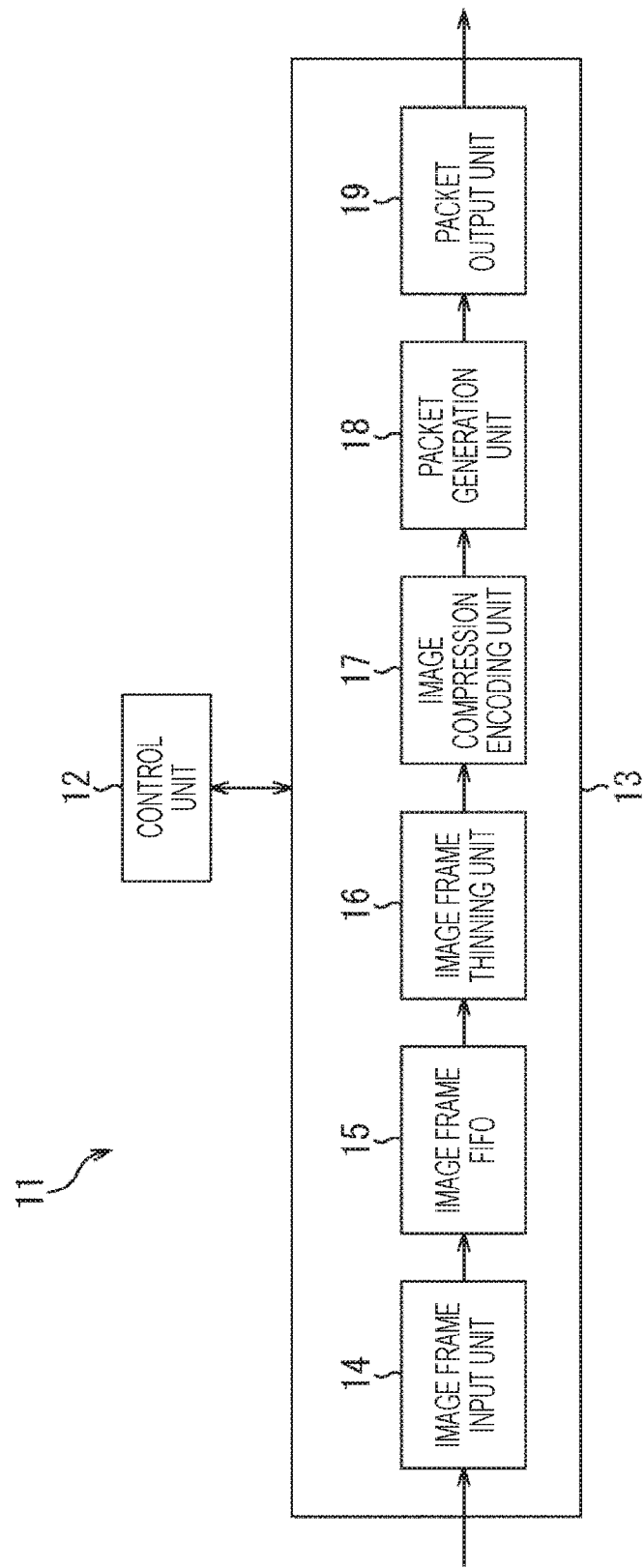
FIG. 3 is a block diagram illustrating an example configuration of an embodiment of an image processing device to which the present technology is applied.

FIG. 3 is a block diagram illustrating an example configuration of an embodiment of the image processing device to which the present technology is applied.

As illustrated in FIG. 3, an image processing device 11 includes a control unit 12 and an image processing unit 13, and is configured to perform image processing on image frames input from outside of the image processing device 11 to adjust displaying rate before or after a timing when the imaging rate is switched.

The control unit 12 controls the image processing unit 13 in accordance with imaging rate information contained in imaging information added to the image frames. Note that the imaging rate information is information indicating the imaging rate at the time when image frames associated with the imaging rate information are imaged, and indicates that a frame is a normally imaged frame that was imaged at the normal rate or that a frame is a high-rate imaged frame that was imaged at a rate higher than the normal rate, for example. Thus, the image frames subjected to the image processing by the image processing device 11 include normally imaged frames imaged at a normal imaging rate, and high-rate imaged frames imaged at a rate higher than the normal imaging rate.

The image processing unit 13 includes an image frame input unit 14, an image frame first in, first out (FIFO) 15, an image frame thinning unit 16, an image compression encoding unit 17, a packet generation unit 18, and a packet output unit 19.

The image frame input unit 14 acquires image frames sequentially input from outside of the image processing device 11, and sequentially supplies the image frames to the image frame FIFO 15. For example, image frames acquired by an imaging device performing imaging, which is not illustrated, are input to the image frame input unit 14.

The image frame FIFO 15 temporarily holds the image frames supplied from the image frame input unit 14. In addition, when image frames are supplied to the image frame FIFO 15, the control unit 12 reads and acquires the imaging rate information of the image frames. The image frame FIFO 15 then sequentially supplies the held image frames, in the order in which the image frames were supplied from the image frame input unit 14, to the image frame thinning unit 16 in accordance with a request from the control unit 12.

The image frame thinning unit 16 performs a thinning determination process on high-rate imaged frames out of the image frame sequence supplied from the image frame FIFO 15, and discards high-rate imaged frames determined to be removed in the thinning determination process, in accordance with a request from the control unit 12. In the meantime, the image frame thinning unit 16 outputs high-rate imaged frames determined as frames to be output and not to be removed in the thinning determination process to the compression encoding unit 17. Note that the image frame thinning unit 16 outputs the normally imaged frames to the image compression encoding unit 17 without performing the thinning determination process thereon.

The image compression encoding unit 17 performs a compression encoding process of compressing and encoding the image frames supplied from the image frame thinning unit 16, and supplies the compressed and encoded image frames resulting from the compression encoding process to the packet generation unit 18, in accordance with a request from the control unit 12. The image compression encoding unit 17 can also performs such processing as thickening of image frames and adjustment of a method of displaying the image frames, as will be described below, in compression encoding of the image frames. Note that the image compression encoding unit 17 can use video compression coding methods such as the advanced video coding (AVC) standard and the high efficiency video coding (HEVC) standard to perform the compression encoding process.

The packet generation unit 18 performs a packetizing process of packetizing the compressed and encoded image frames supplied from the image compression encoding unit 17, and supplies the packetized image frames resulting from the packetizing process to the packet output unit 19, in accordance with a request from the control unit 12. The packet generation unit 18 can also add a display time stamp provided from the control unit 12 to each of the image frames in packetization of the image frames as will be described below. Note that the packet generation unit 18 can use file format structures such as a multiplexing method of the Moving Picture Experts Group (MPEG)-2 systems standard (Packetized Elementary Stream (PES) packet format) and the MPEG-4 Part 14 (MP4) standard, or streaming transmission methods such as the Real-time Transport Protocol (RTP), for example, to perform the packetizing process.

The packet output unit 19 outputs the packetized image frames supplied from the packet generation unit 18 to outside of the image processing device 11. For example, the image frames output from the packet output unit 19 are recorded in a recording device, which is not illustrated.

The image processing device 11 has the configuration as described above, and the image frame thinning process of removing some of high-rate imaged frames is performed by the image frame thinning unit 16 within a predetermined range before or after a timing when the imaging rate is switched, for example.

Next, the image frame thinning process, which is a first example process of image processing performed by the image processing device 11, will be explained with reference to a flowchart of FIG. 4.

For example, operation is started when an instruction to start the image frame thinning process is supplied from a higher-level control device to the image processing device 11, and in step S11, the control unit 12 determines whether or not image frames are input to the image frame input unit 14.

If the control unit 12 has determined in step S11 that no image frames are input to the image frame input unit 14, the process is suspended. If the control unit 12 has determined that image frames are input to the image frame input unit 14, the process proceeds to step S12.

In step S12, the image frame input unit 14 supplies the image frames supplied from outside to the image frame FIFO 15, where the image frames are temporarily held. The control unit 12 then reads and acquires the imaging rate information of the image frames, which have been supplied to the image frame FIFO 15, from the image frame FIFO 15.

In step S13, the control unit 12 determines whether the image frames to which the imaging rate information acquired in step S12 is added are normally imaged frames or high-rate imaged frames on the basis of the imaging rate information.

If the control unit 12 has determined in step S13 that the image frames are normally imaged frames, the process proceeds to step S14, where the image frame thinning unit 16 is requested to determine the image frames to be image frames to be output. Accordingly, the image frame thinning unit 16 supplies the image frames to be output to the image compression encoding unit 17.

If, on the other hand, the control unit 12 has determined in step S13 that the image frames are high-rate imaged frames, the process proceeds to step S15. Specifically, in this case, the control unit 12 determines the high-rate imaged frames to be subjected to a change in the displaying rate. In step S15, the control unit 12 performs the thinning determination process of determining whether or not to thin out the image frames subjected to the image frame thinning process according to expressions (1) and (2), which will be described below.

If the control unit 12 has determined in not to thin out the image frames in step S15 as a result of the thinning determination process, the control unit 12 requests the image frame thinning unit 16 to determine the image frames to be image frames to be output, and the process proceeds to step S14. Thus, in this case, the image frames determined not to be thinned out are supplied from the image frame thinning unit 16 to the image compression encoding unit 17.

If, on the other hand, the control unit 12 has determined in step S15 that the image frames are to be thinned out as a result of the thinning determination process, the process proceeds to step S16. In step S16, the control unit 12 requests the image frame thinning unit 16 to discard the image frames determined to be image frames to be thinned out, and the image frame thinning unit 16 discards the image frames.

After the processing in step S14 or S16, the process proceeds to step S17, where the image compression encoding unit 17 compresses and encodes image frames supplied from the image frame thinning unit 16 and supplies the compressed and encoded image frames to the packet generation unit 18.

In step S18, the packet generation unit 18 packetizes the compressed and encoded image frames supplied from the image compression encoding unit 17 and supplies the packetized image frames to the packet output unit 19, and the packet output unit 19 outputs the packetized image frames to outside of the image processing device 11.

In step S19, the control unit 12 determines whether or not input of image frames to the image processing device 11 is completed.

If it is determined in step S19 that the input of image frames is not completed, the process returns to step S11 and subsequent processing is similarly repeated. If, on the other hand, it is determined in step S19 that the input of image frames is completed, the image frame thinning process is completed.

Here, the thinning determination process in step S15 in FIG. 4 will be explained. For example, the control unit 12 performs determination on the basis of a thinning frequency F set in advance. For example, the thinning frequency F is expressed as in the following expression (1).

[Mathematical Formula 1]

$$F = F(i); \text{ if } D(i) \leq d < D(i+1)(i = 0, \ldots, N-1) \quad (1)$$
$$= 0; \quad \text{else}$$

In the expression (1), a distance d represents the number of frames from an image frame at which the imaging rate is switched (for example the image frame at time tx or time ty in FIG. 1) to an image frame subjected to the image frame thinning process. Furthermore, in the expression (1), a range D represents the number of frames within a range from an image frame at which imaging rate is switched to an image frame to be thinned out (for example, a range Xf or a range Yf in FIG. 5, which will be described below).

Note that the i-th period D(i) [i=0 to N] and the i-th thinning frequency F(i) [i=0 to N−1] may be set to fixed values or values provided externally. For example, the i-th period D(i) and the i-th thinning frequency F(i) can be set to values expressed by the following expression (2). Furthermore, although the expression (2) shows an example where N is 2, N is not limited to 2 but may be 1 or a value of 3 or larger.

[Mathematical Formula 2]

$$\{D(i)\} = \{0, 8, 14\}$$
$$\{F(i)\} = \{½, ⅓\} \quad (2)$$

When the i-th period D(i) and the i-th thinning frequency F(i) are set as expressed by the expression (2), for example, it is determined that image frames at a distance d of 0 to 7 are to be thinned out at a frequency of ½, and that image frames at a distance d of 8 to 13 are to be thinned out at a frequency of ⅓. Furthermore, image frames at a distance d other than 0 to 13 are not to be thinned out.

Effects of the image frame thinning process will be described with reference to FIG. 5.

Figure 5:
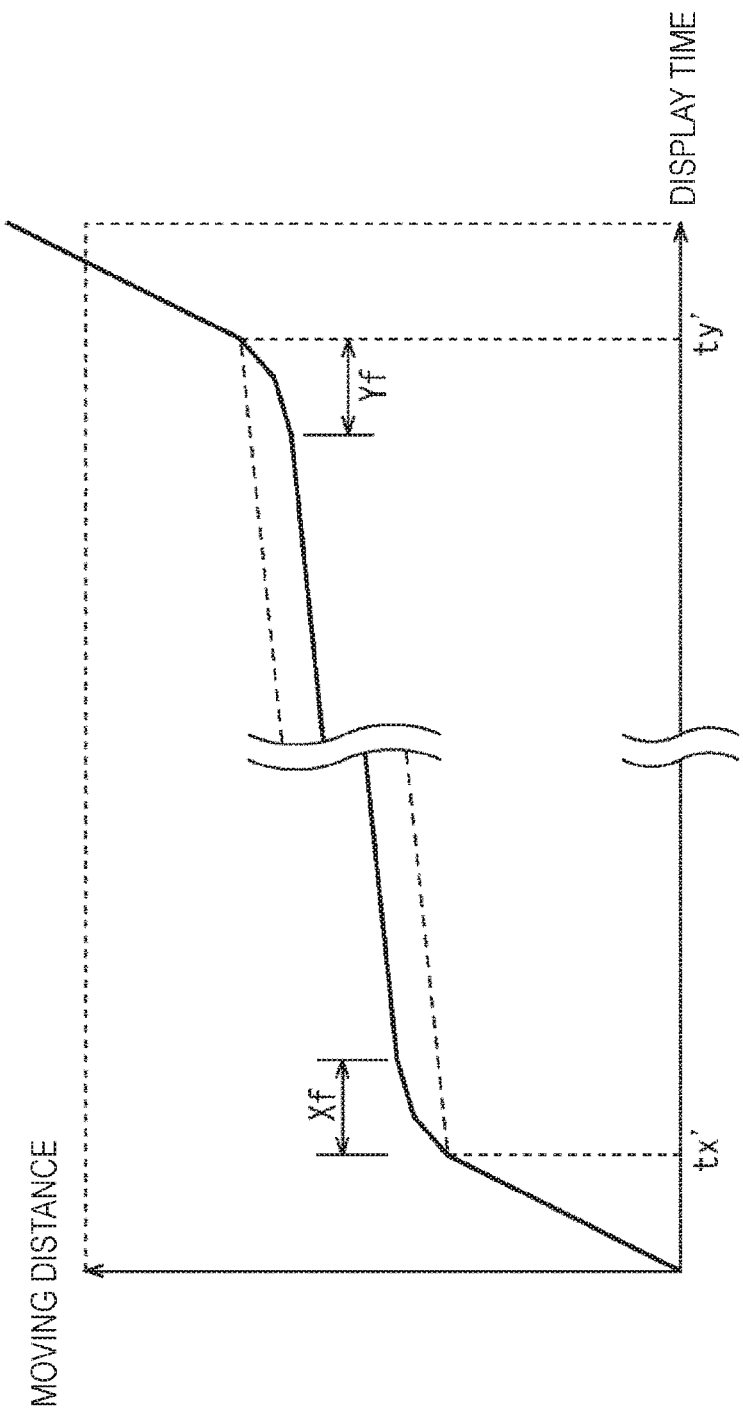
FIG. 5 is a graph for explaining effects of the image frame thinning process.

In FIG. 5, positions of the object, which are obtained by display of image frames output from the image processing device 11 on the display device at regular intervals (30 fps, for example) when image frames acquired through imaging at different imaging rates as shown in FIG. 1 are input to the image processing device 11, are plotted. In FIG. 5, the horizontal axis represents display time, and the vertical axis represents the moving distance of the object.

Figure 4:
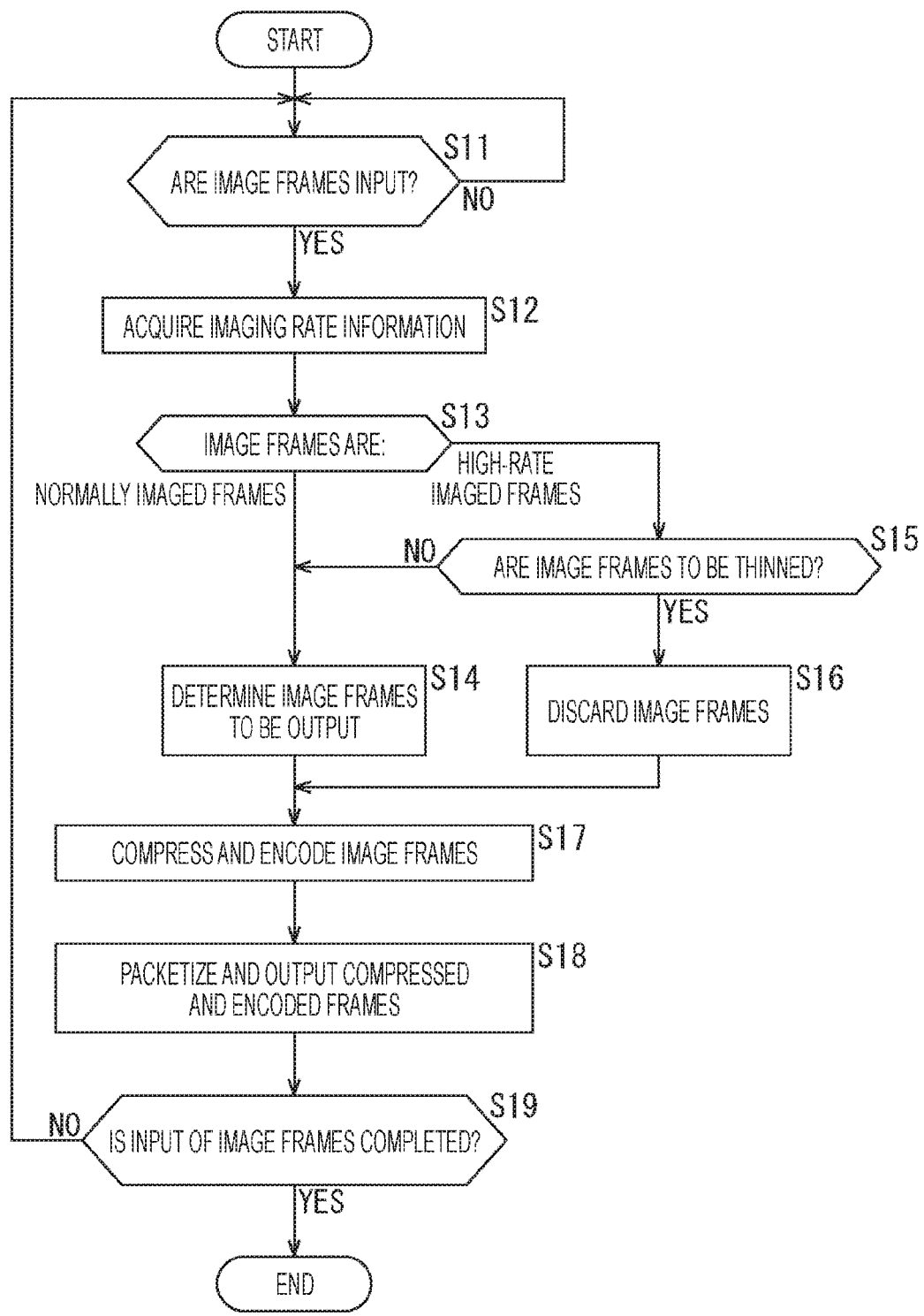
FIG. 4 is a flowchart for explaining an image frame thinning process.

As shown in FIG. 5, within a range Xf after the time tx' corresponding to the time tx (FIG. 1) when the imaging rate is switched from the normal rate to the high rate, some of the high-rate imaged frames (image frames determined to be image frames to be thinned out in step S15 in FIG. 4) are thinned out in the image frame thinning process. Similarly, within a range Yf before the time ty' corresponding to the time ty (FIG. 1) when the imaging rate is switched from the high rate to the normal rate, some of the high-rate imaged frames (image frames determined to be image frames to be thinned out in step S15 in FIG. 4) are thinned out.

As a result of thinning of some of high-rate imaged frames in this manner, image frame sequences at a pseudo imaging rate that is higher than the normal rate and lower than the high rate are generated in the ranges Xf and Yf. As a result, visual discontinuity in display of image frames acquired through imaging at different imaging rates is reduced, and a feeling of strangeness given to the viewer is reduced.

Furthermore, with the i-th period D(i) and the i-th thinning frequency F(i) set as expressed by the aforementioned expression (2), the pseudo rate can be changed in two steps in the ranges Xf and Yf as shown in FIG. 5 and the feeling of strangeness given to the viewer is further reduced.

Note that, in addition to performing the image frame thinning process to reduce visual discontinuity by thinning out some of high-rate imaged frames, the image processing device 11 can reduce the visual discontinuity by thickening some of normally imaged frames, for example.

For example, in the image processing device 11, the image compression encoding unit 17 can thicken the image frames by inserting a single image frame that is the same as the immediately preceding image frame or repeatedly inserting a plurality of image frames that are the same as the respective immediately preceding image frames before or after switching of the imaging rate. In a case where baseband images are inserted, however, the encoding efficiency is decreased, and the image compression encoding unit 17 can thus use the functions of the video compression coding methods.

Specifically, skipped macroblocks (or referred to as SKIP macroblocks or the like) in the advanced video coding (AVC) standard, the high efficiency video coding (HEVC) standard or the like are used. The skipped macroblock is a function of efficiently encoding images where no change is observed. An example of the skipped macroblock is disclosed in Japanese Patent Application Laid-Open No. 2007-243784, for example.

Figure 6:
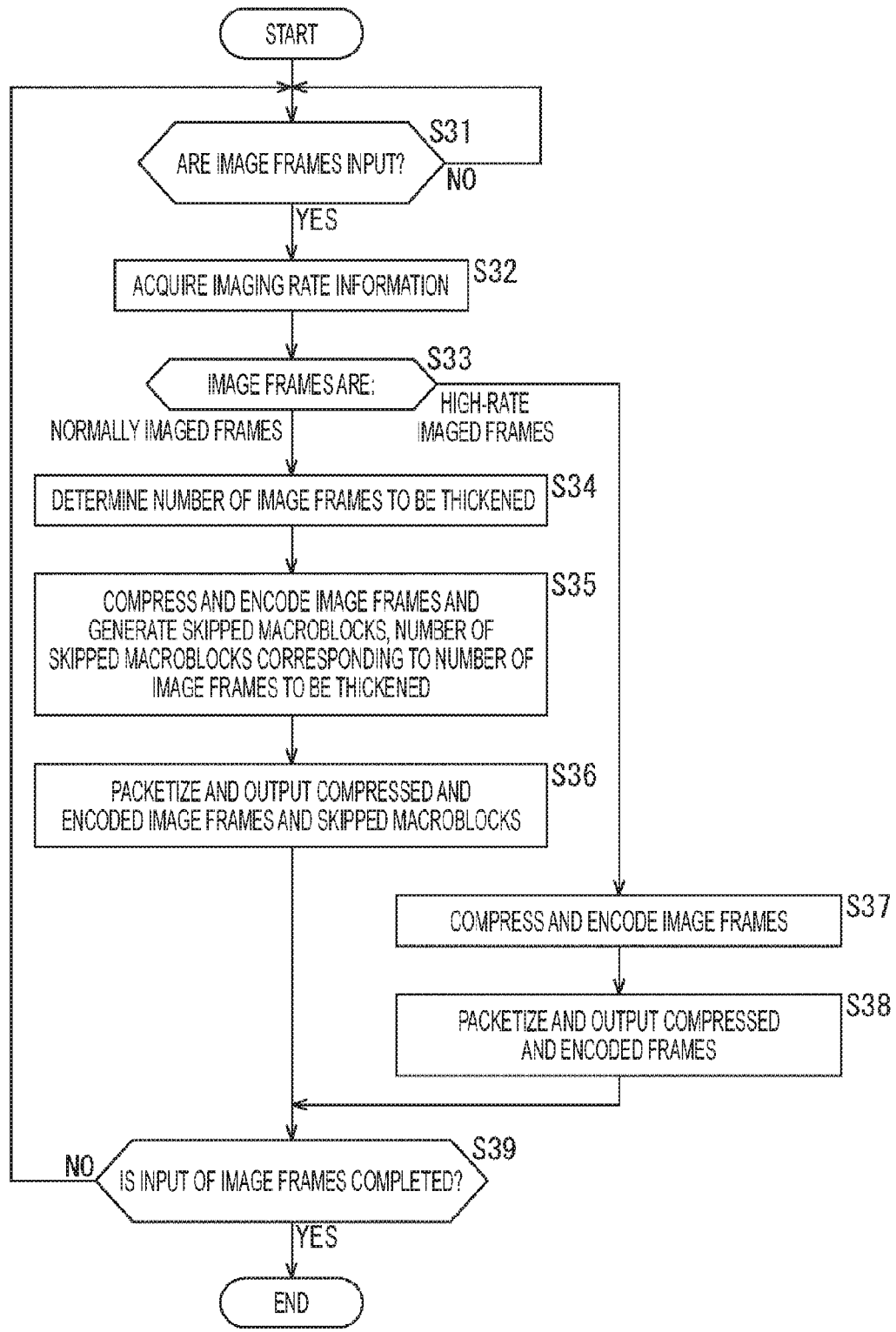
FIG. 6 is a flowchart for explaining an image frame thickening process.

Next, an image frame thickening process, which is a second example process of image processing performed by the image processing device 11, will be explained with reference to a flowchart of FIG. 6.

For example, in steps S31 to S33, processing similar to that in steps S11 to S13 in FIG. 4 is performed. In step S33, if the control unit 12 has determined that the image frames are normally imaged frames, the process proceeds to step S34.

In step S34, the control unit 12 determines the number of image frames to be thickened for thickening of image frames to be thickened according to expressions (3) and (4), which will be described below.

In step S35, the control unit 12 requests the image compression encoding unit 17 to thicken the normally imaged frames with the number of image frames to be thickened determined in step S34. Accordingly, the image compression encoding unit 17 compresses and encodes the image frames, then generates skipped macroblocks, the number of skipped macroblocks being the number of image frames to be thickened, and supplies the generated skipped macroblocks to the packet generation unit 18.

In step S36, the packet generation unit 18 packetizes the compressed and encoded image frames and the skipped macroblocks supplied from the image compression encoding unit 17 and supplies the packetized image frames and macroblocks to the packet output unit 19, and the packet output unit 19 outputs the packetized image frames to outside of the image processing device 11.

If, on the other hand, the control unit 12 has determined in step S33 that the image frames are high-rate imaged frames, the process proceeds to step S37.

Then, in steps S37 to S39, processing similar to that in steps S17 to S19 in FIG. 4 is performed. In step S39, if it is determined that input of the image frames is completed, the image frame thickening process is terminated.

Here, a method for determining the number of image frames to be thickened in step S34 of FIG. 6 will be explained. For example, the control unit 12 determines the number W of image frames to be thickened according to the following expression (3).

[Mathematical Formula 3]

$$W = W(i); \quad \text{if } D(i) \leq d < D(i+1)(i = 0, \ldots, N-1) \quad (3)$$
$$= 0; \quad \text{else}$$

In the expression (3), a distance d represents the number of frames from an image frame at which the imaging rate is switched (for example the image frame at time tx or time ty in FIG. 1) to an image frame subjected to the image frame thickening process. Furthermore, in the expression (3), a range D represents the number of frames within a range from an image frame at which imaging rate is switched to an image frame to be thickened (for example, a range Xn or a range Yn in FIG. 7, which will be described below).

Note that the i-th period D(i) [i=0 to N] and the i-th number W(i) [i=0 to N−1] of frames to be thickened may be set to fixed values or values provided externally. For example, the i-th period D(i) and the i-th number W(i) of frames to be thickened can be set to values expressed by the following expression (4). Furthermore, although the expression (4) shows an example where N is 2, N is not limited to 2 but may be 1 or a value of 3 or larger.

[Mathematical Formula 4]

$$\{D(i)\}=\{0,8,14\}$$

$$\{W(i)\}=\{2,1\} \quad (4)$$

When the i-th period D(i) and the i-th number W(i) of frames to be thickened are set as expressed by the expression (4), for example, it is determined that the number of frames to be thickened for image frames at a distance d of 0 to 7 is two, and that the number of frames to be thickened for image frames at a distance d of 8 to 13 is one. In addition, image frames at a distance d other than 0 to 13 are not to be thickened.

Effects of the image frame thickening process will be described with reference to FIG. 7.

Figure 7:
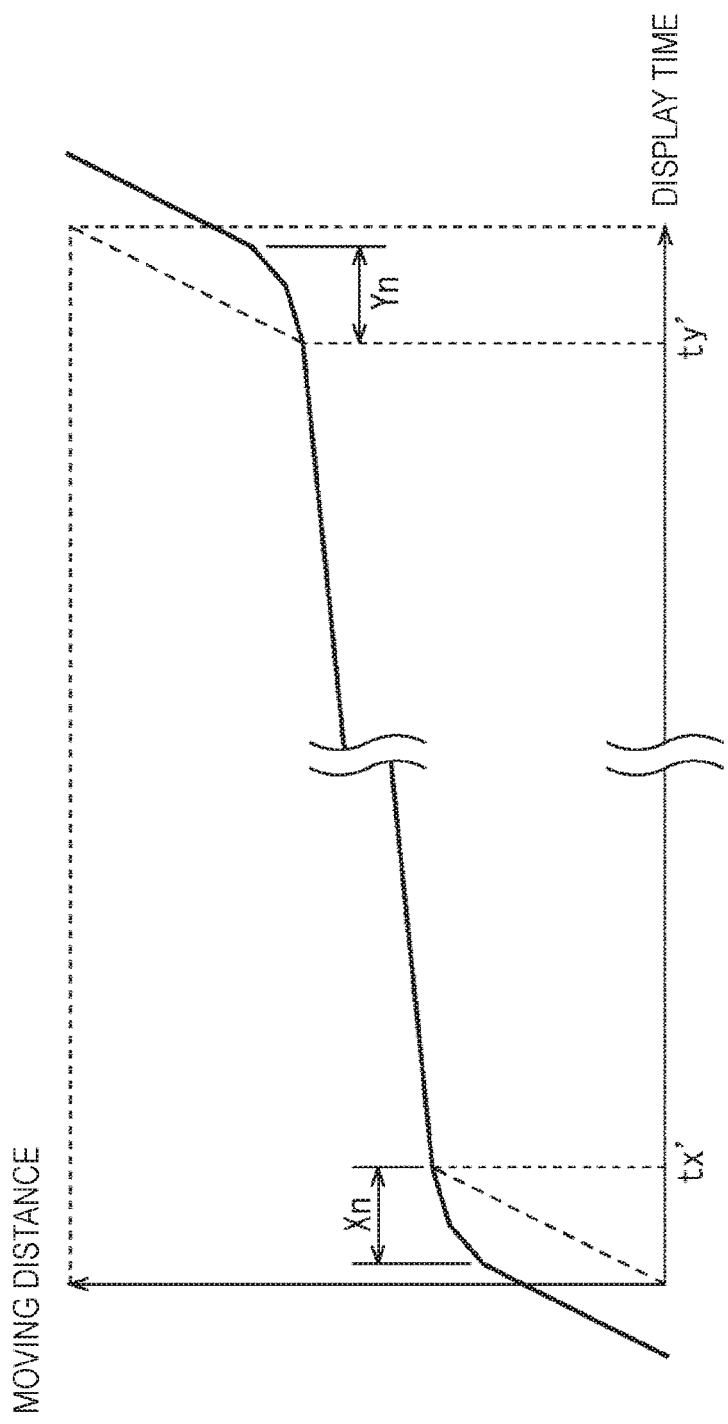
FIG. 7 is a graph for explaining effects of the image frame thickening process.

In FIG. 7, positions of the object, which are obtained by display of image frames output from the image processing device 11 on the display device at regular intervals (30 fps, for example) when image frames acquired through imaging at different imaging rates as shown in FIG. 1 are input to the image processing device 11, are plotted. In FIG. 7, the horizontal axis represents display time, and the vertical axis represents the moving distance of the object.

As shown in FIG. 7, within a range Xn before the time tx' corresponding to the time tx (FIG. 1) when the imaging rate is switched from the normal rate to the high rate, the normally imaged frames are thickened by the image frame thickening process. Similarly, within a range Yn after the time ty' corresponding to the time ty (FIG. 1) when the imaging rate is switched from the high rate to the normal rate, the normally imaged frames are thickened.

As a result of thickening of some of normally imaged frames in this manner, image frame sequences at a pseudo imaging rate that is higher than the normal rate and lower than the high rate are generated in the ranges Xn and Yn. As a result, visual discontinuity in display of image frames acquired through imaging at different imaging rates is reduced, and a feeling of strangeness given to the viewer is reduced.

Furthermore, the image processing device 11 can also reduce the visual discontinuity as described above by adjusting the image frame display method by using the functions of the video compression coding methods. For example, the image processing device 11 can adjust a parameter specifying frame rate for displaying high-rate imaged frames or normally imaged frames before or after switching of the imaging rate, for example.

Specifically, the image processing device 11 adjusts a pic_struct parameter in the advanced video coding (AVC) standard, the high efficiency video coding (HEVC) standard, or the like. The pic_struct parameter is a parameter contained in a picture timing supplemental enhancement information (SEI) message, and specifies a display method after a process of decoding a picture (encoded image frames) containing the message. In particular, when the pic_struct parameter has a value of 7 or 8, the period during which the image frames are displayed is a period that is twice or three times the period, respectively, expressed by an inverse of a frame rate specified separately. Note that when the pic_struct parameter has a value 0, the display interval of the image frames is a period that is an inverse of the frame rate.

Figure 8:
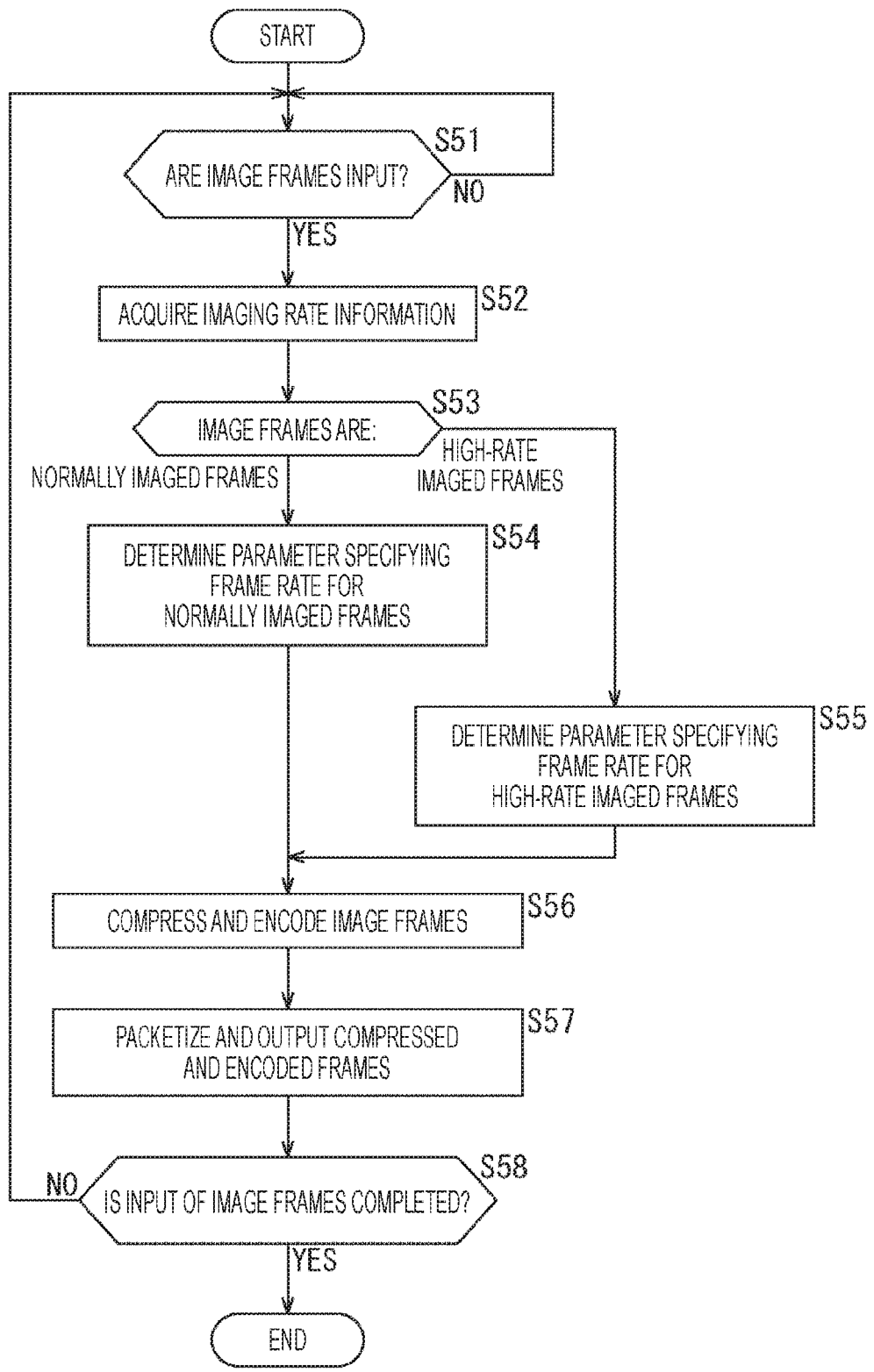
FIG. 8 is a flowchart for explaining a parameter adjustment process.

Next, a parameter adjustment process, which is a third example process of image processing performed by the image processing device 11, will be explained with reference to a flowchart of FIG. 8.

For example, in steps S51 to S53, processing similar to that in steps S11 to S13 in FIG. 4 is performed. In step S53, if the control unit 12 has determined that the image frames are normally imaged frames, the process proceeds to step S54.

In step S54, the control unit 12 determines the value of a parameter (pic_struct parameter) specifying the frame rate of image frames subjected to the parameter adjustment process according to expressions (5) and (6), which will be described below.

If, on the other hand, the control unit 12 has determined in step S53 that the image frames are high-rate imaged frames, the process proceeds to step S55.

In step S55, the control unit 12 determines the value of a parameter (pic_struct parameter) specifying the frame rate of image frames subjected to the parameter adjustment process. For example, for displaying the high-rate imaged frames at an original rate, the control unit 12 determines the value of the pic_struct parameter to be 0.

Then, in steps S56 to S58, processing similar to that in steps S17 to S19 in FIG. 4 is performed. In step S58, if it is determined that input of the image frames is completed, the parameter adjustment process is terminated.

Here, a method for determining the pic_struct parameter in step S54 of FIG. 8 will be explained. For example, the control unit 12 determines the value V of the pic_struct parameter according to the following expression (5).

[Mathematical Formula 5]

$$V = V(i); \quad \text{if } D(i) \leq d < D(i+1)(i = 0, \ldots, N-1)$$
$$= 0; \quad \text{else} \tag{5}$$

In the expression (5), a distance d represents the number of frames from an image frame at which the imaging rate is switched (for example the image frame at time tx or time ty in FIG. 1) to an image frame subjected to the parameter adjustment process. Furthermore, in the expression (5), a range D represents the number of frames within a range from an image frame at which imaging rate is switched to an image frame subjected to parameter adjustment (for example, a range Xn or a range Yn in FIG. 7 described above).

Note that the i-th period D(i) [i=0 to N] and the i-th value V(i) [i=0 to N−1] of the pic_struct parameter may be set to fixed values or values provided externally. In this case, either of 7 or 8 is specified as the value V(i) of the pic_struct parameter. For example, the i-th period D(i) and the i-th number W(i) of frames to be thickened can be set to values expressed by the following expression (6). Furthermore, although the expression (6) shows an example where N is 2, N is not limited to 2 but may be 1 or a value of 3 or larger.

[Mathematical Formula 6]

$$\{D(i)\}=\{0,8,14\}$$

$$\{V(i)\}=\{8,7\} \tag{6}$$

When the i-th period D(i) and the i-th value V(i) of the pic_struct parameter are set as expressed by the expression (6), for example, the value V of the pic_struct parameter for image frames at a distance d of 0 to 7 is determined to be 8, and the value V of the pic_struct parameter for image frames at a distance d of 8 to 13 is determined to be 7. In addition, the value V of the pic_struct parameter for image frames at a distance d other than 0 to 13 is 0.

As describe above, similarly to the effects shown in FIG. 7 described above, the display period of some of the normally imaged frames becomes longer within the range Xn before the time tx' corresponding to the time tx (FIG. 1) when the imaging rate is switched from the normal rate to the high rate, as a result of the parameter adjustment process. Similarly, the display period of some of the normally imaged frames becomes longer within a range Yn after the time ty' corresponding to the time ty (FIG. 1) when the imaging rate is switched from the high rate to the normal rate.

As a result of adjusting the parameter specifying the frame rate of the normally imaged frames in this manner, image frame sequences at a pseudo imaging rate that is higher than the normal rate and lower than the high rate are generated in the ranges Xn and Yn shown in FIG. 7. As a result, visual discontinuity in display of image frames acquired through imaging at different imaging rates is reduced, and a feeling of strangeness given to the viewer is reduced.

Furthermore, the image processing device 11 can also reduce the visual discontinuity as described above by adjusting a display time stamp that is a parameter specifying the display time of an image frame. For example, the image processing device 11 can adjust the display time stamp of a high-rate imaged frame or a normally imaged frame before or after switching of the imaging rate, for example.

For example, a display time stamp includes a presentation time-stamp (PTS) based on the MPEG-2 Systems standard, and can be added to each encoded image frame (picture).

Next, a display time stamp adjustment process, which is a fourth example process of image processing performed by the image processing device 11, will be explained with reference to a flowchart of FIG. 9.

For example, in steps S71 to S73, processing similar to that in steps S11 to S13 in FIG. 4 is performed. In step S73, if the control unit 12 has determined that the image frames are normally imaged frames, the process proceeds to step S74.

In step S74, the control unit 12 determines an increase in the display time stamp for image frames (normally imaged frames) subjected to the display time stamp adjustment process according to expressions (7) and (8), which will be described below.

If, on the other hand, the control unit 12 has determined in step S73 that the image frames are high-rate imaged frames, the process proceeds to step S75.

In step S75, the control unit 12 determines an increase in the display time stamp for image frames (high-rate imaged frames) subjected to the display time stamp adjustment process according to expressions (9) and (10), which will be described below.

After the processing in step S74 or S75, the process proceeds to step S76, where the control unit 12 adds the increase in the display time stamp determined in step S74 or S75 to the display time stamp of current image frames subjected to the display time stamp adjustment process.

Then, in steps S77 to S79, processing similar to that in steps S17 to S19 in FIG. 4 is performed. In step S79, if it is determined that input of the image frames is completed, the display time stamp adjustment process is terminated.

Here, a method for determining the increase in the display time stamp for the normally imaged frames in step S74 of FIG. 9 will be explained. For example, the control unit 12 determines the increase T in the display time stamp according to the following expression (7).

[Mathematical Formula 7]

$$T = T(i); \quad \text{if } D(i) \le d < D(i+1)(i = 0, \ldots, N-1) \quad (7)$$
$$= 1/f; \quad \text{else}$$

In the expression (7), a distance d represents the number of frames from an image frame at which the imaging rate is switched (for example the image frame at time tx or time ty in FIG. 1) to an image frame subjected to the display time stamp adjustment process. Furthermore, in the expression (7), a range D represents the number of frames within a range from an image frame at which imaging rate is switched to an image frame subjected to the display time stamp adjustment (for example, a range Xn or a range Yn in FIG. 10, which will be described below). Furthermore, in the expression (7), a frame rate f represents the displaying rate of image frames on the display device.

Note that the i-th period D(i) [i=0 to N] and the i-th increase T(i) [i=0 to N−1] in the display time stamp may be set to fixed values or values provided externally. In this case, a value of 1/f or larger is specified as the increase T(i) in the display time stamp. For example, the i-th period D(i) and the i-th increase T(i) in the display time stamp can be set to values expressed by the following expression (8). Furthermore, although the expression (8) shows an example where N is 2, N is not limited to 2 but may be 1 or a value of 3 or larger. In addition, the frame rate f is set to 30, for example.

[Mathematical Formula 8]

$$\{D(i)\}=\{0,8,14\}$$
$$\{T(i)\}=\{1/10, 1/15\} \quad (8)$$

When the i-th period D(i) and the i-th increase T(i) in the display time stamp are set as expressed by the expression (8), for example, the value of the increase T(i) in the display time stamp for image frames at a distance d of 0 to 7 is determined to be 1/10, and the value of the increase T(i) in the display time stamp for image frames at a distance d of 8 to 13 is determined to be 1/15. In addition, the increase T(i) in the display time stamp for image frames at a distance d other than 0 to 13 is determined to be 1/30.

Subsequently, a method for determining the increase in the display time stamp for the high-rate imaged frames in step S75 of FIG. 9 will be explained. For example, the control unit 12 determines the increase T in the display time stamp according to the following expression (9).

[Mathematical Formula 9]

$$T = T(i); \quad \text{if } D(i) \le d < D(i+1)(i = 0, \ldots, N-1) \quad (9)$$
$$= 1/f; \quad \text{else}$$

In the expression (9), a distance d represents the number of frames from an image frame at which the imaging rate is switched (for example the image frame at time tx or time ty in FIG. 1) to an image frame subjected to the display time stamp adjustment process. Furthermore, in the expression (9), a range D represents the number of frames within a range from an image frame at which imaging rate is switched to an image frame subjected to the display time stamp adjustment (for example, a range Xf or a range Yf in FIG. 10, which will be described below). Furthermore, in the expression (9), a frame rate f represents the displaying rate of image frames on the display device.

Note that the i-th period D(i) [i=0 to N] and the i-th increase T(i) [i=0 to N−1] in the display time stamp may be set to fixed values or values provided externally. In this case, a value of 1/f or smaller is specified as the increase T(i) in the display time stamp. For example, the i-th period D(i) and the i-th increase T(i) in the display time stamp can be set to values expressed by the following expression (10). Although the expression (10) shows an example where N is 2, N is not limited to 2 but may be 1 or a value of 3 or larger. In addition, the frame rate f is set to 30, for example.

[Mathematical Formula 10]

$$\{D(i)\}=\{0,8,14\}$$
$$\{T(i)\}=\{1/120, 1/60\} \quad (10)$$

When the i-th period D(i) and the i-th increase T(i) in the display time stamp are set as expressed by the expression (10), for example, the value of the increase T(i) in the display time stamp for image frames at a distance d of 0 to 7 is determined to be $\frac{1}{120}$, and the value of the increase T(i) in the display time stamp for image frames at a distance d of 8 to 13 is determined to be $\frac{1}{60}$. In addition, the increase T(i) in the display time stamp for image frames at a distance d other than 0 to 13 is determined to be $\frac{1}{30}$.

Note that a sequence of display time stamps obtained as described above is in the order in which the sequence of image frames is displayed. In contrast, a sequence of encoded image frames output from the image compression encoding unit 17 is typically rearranged according to reference association in compression encoding. Thus, the packet generation unit 18 rearranges the sequence of display time stamps before adding the display time stamps.

Effects of the display time stamp adjustment process will be described with reference to FIG. 10.

Figure 10:
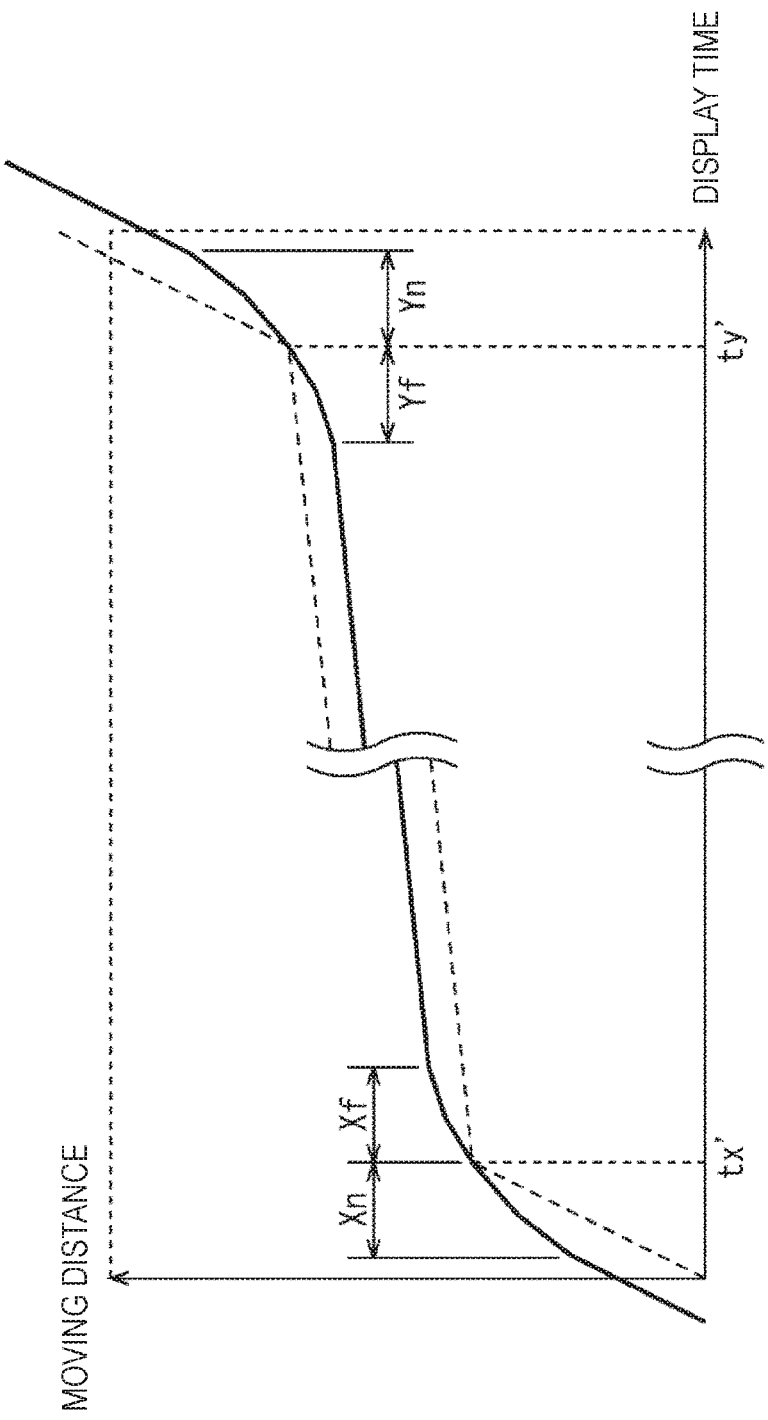
FIG. 10 is a graph for explaining effects of the display time stamp adjustment process.

In FIG. 10, positions of the object, which are obtained by display of image frames output from the image processing device 11 on the display device at regular intervals (30 fps, for example) when image frames imaged as shown in FIG. 1 are input to the image processing device 11, are plotted. In FIG. 10, the horizontal axis represents display time, and the vertical axis represents the moving distance of the object.

As shown in FIG. 10, the display period of some of the normally imaged frames becomes longer within the range Xn before the time tx' corresponding to the time tx (FIG. 1) when the imaging rate is switched from the normal rate to the high rate and the range Yn after the time ty' corresponding to the time ty (FIG. 1) when the imaging rate is switched from the high rate to the normal rate, as a result of the increase of the display time stamp for the normally imaged frames (step S74 of FIG. 9) in the display time stamp adjustment process.

Figure 9:
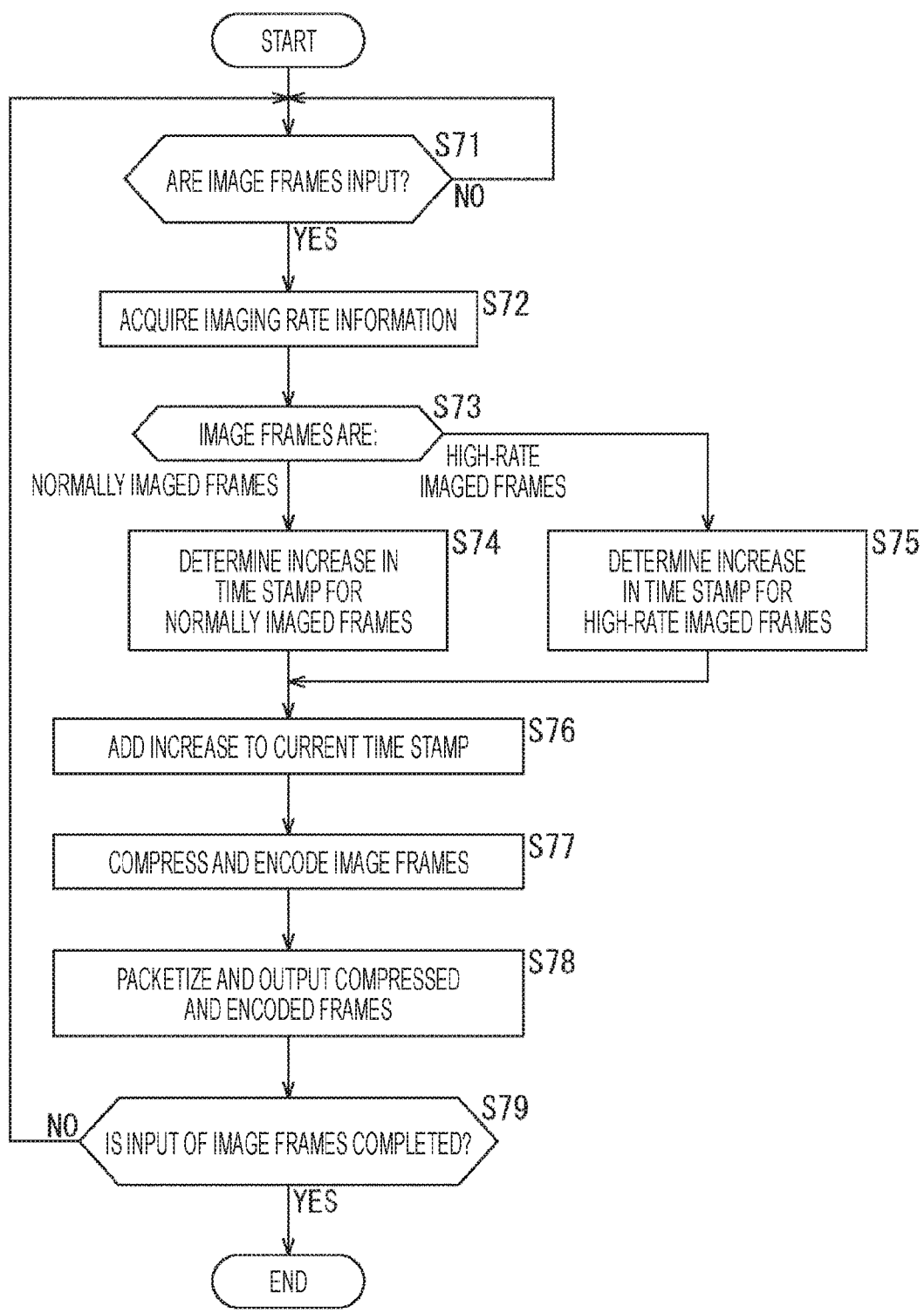
FIG. 9 is a flowchart for explaining a display time stamp adjustment process.

Furthermore, the display period of some of the high-rate imaged frames becomes shorter within the range Xf after the time tx' corresponding to the time tx (FIG. 1) when the imaging rate is switched from the normal rate to the high rate and the range Yf before the time ty' corresponding to the time ty (FIG. 1) when the imaging rate is switched from the high rate to the normal rate, as a result of the increase of the display time stamp for the high-rate imaged frames (step S75 of FIG. 9).

As a result of increasing the display time stamps for the normally imaged frames and the high-rate imaged frames in this manner, image frame sequences at a pseudo imaging rate that is higher than the normal rate and lower than the high rate are generated in the ranges Xn and Yn and in the ranges Xf and Yf. As a result, visual discontinuity in display of image frames acquired through imaging at different imaging rates is reduced, and a feeling of strangeness given to the viewer is reduced.

In particular, as a result of the increase of the display time stamps for both of the normally imaged frames and the high-rate imaged frames, image frame sequences at a pseudo imaging rate can be generated in a wider range, which produces better effects.

Note that, in a case where the display time stamps are increased only for the normally imaged frames in the display time stamp adjustment process, for example, effects similar to those of FIG. 7 described above are produced. Similarly, in a case where the display time stamps are increased only for the high-rate imaged frames in the display time stamp adjustment process, effects similar to those of FIG. 5 described above are produced.

Furthermore, as shown in FIG. 10, generation of image frame sequences at the pseudo imaging rate in the ranges Xn and Yn and the ranges Xf and Yf may be performed in combination with a process other than the display time stamp adjustment process.

Specifically, for example, in a case where the image frame thinning process (FIG. 4) and the image frame thickening process (FIG. 6) are combined, image frame sequences at the pseudo imaging rate can be generated in the ranges Xn and Yn and the ranges Xf and Yf, similarly to FIG. 10. In addition, combination of any of the image frame thinning process (FIG. 4), the image frame thickening process (FIG. 6), the parameter adjustment process (FIG. 8), and the display time stamp adjustment process (FIG. 9) as appropriate produces effects as shown in FIG. 10.

As described above, the image processing device 11 is capable of changing the displaying rate of both of the normally imaged frames and the high-rate imaged frames, achieving higher flexibility than the conventional technologies. Furthermore, the image processing device 11 is applicable to an imaging device configured to perform imaging to acquire image frame sequences, a recording device configured to encode record an image frame sequence, an editing device configured to perform encoding in editing an image frame sequence, and the like, for example, achieving higher versatility than the conventional technologies. The image processing device 11 is therefore capable of increasing the utility of processing for reducing discontinuity in display of image frames acquired through imaging at different imaging rates.

It should be noted that the respective processes described above with reference to the flowcharts are not necessarily carried out in chronological order in accordance with the sequences shown as the flowcharts, but include procedures to be carried out in parallel or independently of one another (such as parallel procedures or object-based procedures). Furthermore, the program may be executed by one CPU, or may be executed in a distributive manner by more than one CPU.

The above described series of processes (information processing methods) can be performed by hardware, and can also be performed by software. In a case where the series of processes are performed by software, the program that forms the software may be installed in a computer incorporated into special-purpose hardware, or may be installed from a program recording medium into a general-purpose personal computer or the like that can execute various kinds of functions by installing various kinds of programs.

Figure 11:
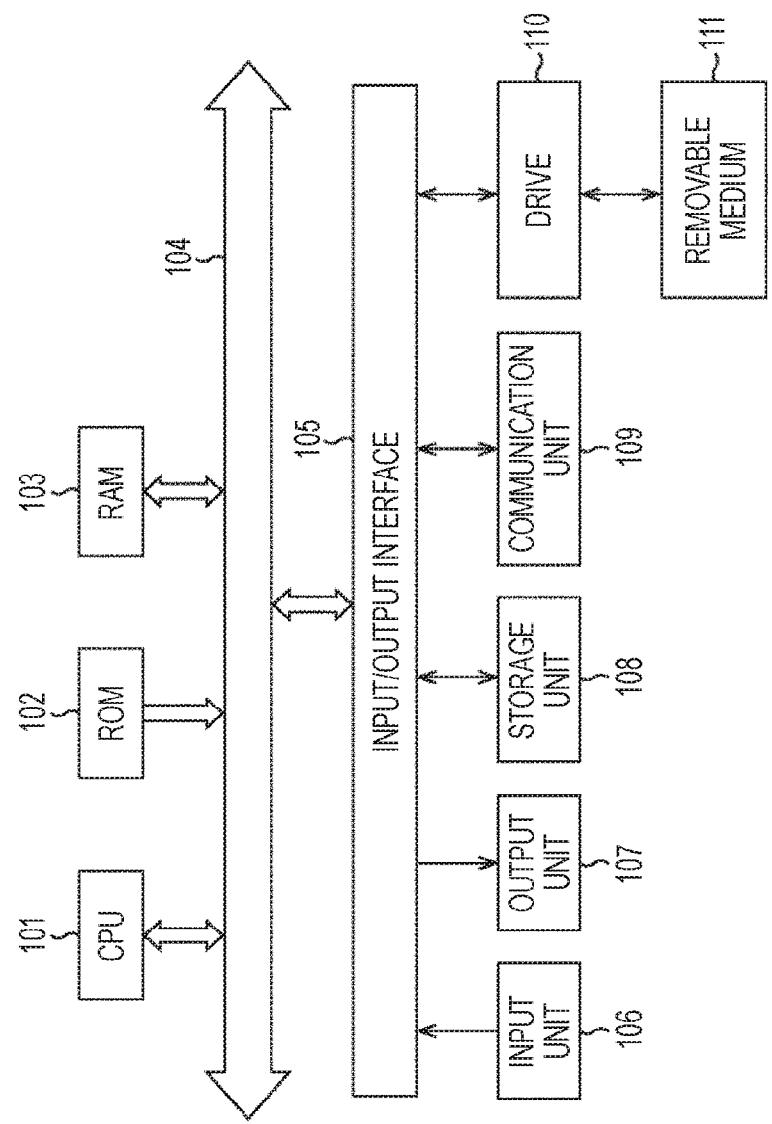
FIG. 11 is a block diagram illustrating an example configuration of an embodiment of a computer to which the present technology is applied.

FIG. 11 is a block diagram illustrating an example configuration of hardware of a computer that performs the above-described series of processes in accordance with a program.

In the computer, a central processing unit (CPU) 101, a read only memory (ROM) 102, and a random access memory (RAM) 103 are connected to one another by a bus 104.

An input/output interface 105 is further connected to the bus 104. An input unit 106 constituted by a keyboard, a mouse, a microphone, or the like, an output unit 107 constituted by a display, a speaker, or the like, a storage unit 108 constituted by a hard disk, a nonvolatile memory, or the like, a communication unit 109 constituted by a network interface or the like, and a drive 110 that drives a removable medium 111 such as a magnetic disk, an optical disk, a magnetooptical disk, or a semiconductor memory are connected to the input/output interface 105.

In the computer having the above described configuration, the CPU 101 loads a program stored in the storage unit 108 into the RAM 103 via the input/output interface 105 and the bus 104, and executes the program, so that the above described series of processes are performed.

The program to be executed by the computer (the CPU 101) is recorded on the removable medium 111, which is a packaged medium such as a magnetic disk (including a flexible disk), an optical disk (such as a compact disc read only memory (CD-ROM) or a digital versatile disc (DVD)), an magnetooptical disk, or a semiconductor memory, and is provided via a wired or wireless transmission medium such as a local area network, the Internet, or digital satellite broadcasting.

In addition, the program can be installed into the storage unit 108 via the input/output interface 105 when the removable medium 111 is mounted on the drive 110. The program can also be received by the communication unit 109 via a wired or wireless transmission medium, and be installed into the storage unit 108. Alternatively, the program may be installed beforehand into the ROM 102 or the storage unit 108.

It should be noted that the present technology may also be embodied in the configurations described below.

(1)

An image processing device including:

an image frame determination unit configured to determine, from image frames acquired through imaging at different imaging rates, image frames imaged at at least one of the different imaging rates to be image frames for which a displaying rate is to be changed; and a displaying rate adjustment unit configured to adjust the displaying rate of the image frames, determined to be the image frames for which the displaying rate is to be changed by the image frame determination unit, within a predetermined period from a timing when the imaging rate is switched.

(2)

The image processing device of (1), wherein the image frames includes normally imaged frames imaged at a normal imaging rate, and high-rate imaged frames imaged at a rate higher than the normal imaging rate.

(3)

The image processing device of (2), wherein the displaying rate adjustment unit performs a process of thinning some of the image frames on the high-rate imaged frames.

(4)

The image processing device of (2) or (3), wherein the displaying rate adjustment unit performs a process of thickening image frames corresponding to some of the image frames on the normally imaged frames before encoding.

(5)

The image processing device of any one of (2) to (4), wherein the displaying rate adjustment unit performs a process of adjusting a value of a parameter specifying a frame rate for displaying the image frames on at least either of the normally imaged frames and the high-rate imaged frames.

(6)

The image processing device of any one of (2) to (5), wherein the displaying rate adjustment unit performs a process of adjusting a value of a display time stamp specifying display time of the image frames on at least either of the normally imaged frames and the high-rate imaged frames.

(7)

The image processing device of any one of (2) to (6), wherein the displaying rate adjustment unit performs a combination of any of a process of thinning some of the image frames on the high-rate imaged frames, a process of thickening image frames corresponding to some of the image frames on the normally imaged frames before encoding, a process of adjusting a value of a parameter specifying a frame rate for displaying the image frames on at least either of the normally imaged frames and the high-rate imaged frames, and a process of adjusting a value of a display time stamp specifying display time of the image frames on at least either of the normally imaged frames and the high-rate imaged frames.

(8)

An image processing method including the steps of:

determining, from image frames acquired through imaging at different imaging rates, image frames imaged at at least one of the different imaging rates to be image frames for which a displaying rate is to be changed; and adjusting the displaying rate of the image frames, determined to be the image frames for which the displaying rate is to be changed, within a predetermined period from a timing when the imaging rate is switched.

(9)

A program causing a computer to execute processing including the steps of:

determining, from image frames acquired through imaging at different imaging rates, image frames imaged at at least one of the different imaging rates to be image frames for which a displaying rate is to be changed; and adjusting the displaying rate of the image frames, determined to be the image frames for which the displaying rate is to be changed, within a predetermined period from a timing when the imaging rate is switched.

It should be noted that the embodiment is not limited to the above described embodiments, and various modifications may be made to them without departing from the scope of the present disclosure.

REFERENCE SIGNS LIST

11 Image processing device
12 Control unit
13 Image processing unit
14 Image frame input unit
15 Image frame FIFO
16 Image frame thinning unit
17 Image compression encoding unit
18 Packet generation unit
19 Packet output unit

The invention claimed is:

1. An image processing device comprising:
   an image frame determination unit configured to
      acquire a plurality of image frames, a first portion of the plurality of image frames having a first imaging rate and a second portion of the plurality of image frames having a second imaging rate,
      determine when a change in a displaying rate of the plurality of image frames is to occur based on a change between the first portion of the plurality of image frames having the first imaging rate and the second portion of the plurality of image frames having the second imaging rate; and
   a displaying rate adjustment unit configured to
      transition the displaying rate of the plurality of image frames from a first displaying rate to a second displaying rate during a predetermined period, the predetermined period having a beginning or an end that occurs when the change between the first portion of the plurality of image frames and the second portion of the plurality of image frames is to occur.

2. The image processing device according to claim 1, wherein the first portion is normally imaged frames and the first imaging rate is a normal imaging rate, and wherein the second portion is high-rate imaged frames and the second imaging rate is a rate higher than the normal imaging rate.

3. The image processing device according to claim 2, wherein, to transition the displaying rate of the plurality of image frames from the first displaying rate to the second displaying rate, the displaying rate adjustment unit is further configured to thin out the second portion of the plurality of image frames during the predetermined period having the beginning that occurs when the change between the first portion of the plurality of image frames and the second portion of the plurality of image frames is to occur.

4. The image processing device according to claim 2, wherein, to transition the displaying rate of the plurality of image frames from the first displaying rate to the second displaying rate, the displaying rate adjustment unit is further configured to thicken the first portion of the plurality of image frames during the predetermined period having the end that occurs when the change between the first portion of the plurality of image frames and the second portion of the plurality of image frames is to occur.

5. The image processing device according to claim 2, wherein, to transition the displaying rate of the plurality of image frames from the first displaying rate to the second displaying rate, the displaying rate adjustment unit is further configured to adjust a value of a parameter specifying a frame rate for displaying the plurality of image frames.

6. The image processing device according to claim 2, wherein, to transition the displaying rate of the plurality of image frames from the first displaying rate to the second displaying rate, the displaying rate adjustment unit is further configured to adjust a value of a display time stamp specifying a display time of the plurality of image frames.

7. The image processing device according to claim 2, wherein the image frame determination unit is further configured to determine when a second change in the displaying rate of the plurality of image frames is to occur based on a second change between the first portion of the plurality of image frames having the first imaging rate and the second portion of the plurality of image frames having the second imaging rate, and
wherein the displaying rate adjustment unit is further configured to transition the displaying rate of the plurality of image frames from the second displaying rate to the first displaying rate during a second predetermined period, the second predetermined period having a beginning or an end that occurs when the second change between the first portion of the plurality of image frames and the second portion of the plurality of image frames is to occur.

8. An image processing method comprising:
acquiring, with an electronic processor, a plurality of image frames, a first portion of the plurality of image frames having a first imaging rate and a second portion of the plurality of image frames having a second imaging rate;
determining, with the electronic processor, when a change in a displaying rate of the plurality of image frames is to occur based on a change between the first portion of the plurality of image frames having the first imaging rate and the second portion of the plurality of image frames having the second imaging rate; and
transitioning, with the electronic processor, the displaying rate of the plurality of image frames from a first displaying rate to a second displaying rate during a predetermined period,
the predetermined period having a beginning or an end that occurs when the change between the first portion of the plurality of image frames and the second portion of the plurality of image frames is to occur.

9. The image processing method according to claim 8, further comprising:
determining when a second change in the displaying rate of the plurality of image frames is to occur based on a second change between the first portion of the plurality of image frames having the first imaging rate and the second portion of the plurality of image frames having the second imaging rate; and
transitioning the displaying rate of the plurality of image frames from the second displaying rate to the first displaying rate during a second predetermined period, the second predetermined period having a beginning or an end that occurs when the second change between the first portion of the plurality of image frames and the second portion of the plurality of image frames is to occur.

10. The image processing method according to claim 8, wherein the first portion is normally imaged frames and the first imaging rate is a normal imaging rate, and wherein the second portion is high-rate imaged frames and the second imaging rate is a rate higher than the normal imaging rate.

11. The image processing method according to claim 10, wherein transitioning the displaying rate of the plurality of image frames from the first displaying rate to the second displaying rate further includes thinning out the second portion of the plurality of image frames during the predetermined period having the beginning that occurs when the change between the first portion of the plurality of image frames and the second portion of the plurality of image frames is to occur.

12. The image processing method according to claim 10, wherein transitioning the displaying rate of the plurality of image frames from the first displaying rate to the second displaying rate further includes thickening the first portion of the plurality of image frames during the predetermined period having the end that occurs when the change between the first portion of the plurality of image frames and the second portion of the plurality of image frames is to occur.

13. The image processing method according to claim 10, wherein transitioning the displaying rate of the plurality of image frames from the first displaying rate to the second displaying rate further includes adjusting a value of a parameter specifying a frame rate for displaying the plurality of image frames.

14. The image processing method according to claim 10, wherein transitioning the displaying rate of the plurality of image frames from the first displaying rate to the second displaying rate further includes adjusting a value of a display time stamp specifying a display time of the plurality of image frames.

15. A non-transitory computer-readable medium comprising a program that, when executed by an electronic processor, causes the electronic processor to perform a set of operations, the set of operations comprising:
acquiring a plurality of image frames, a first portion of the plurality of image frames having a first imaging rate and a second portion of the plurality of image frames having a second imaging rate;

determining when a change in a displaying rate of the plurality of image frames is to occur based on a change between the first portion of the plurality of image frames having the first imaging rate and the second portion of the plurality of image frames having the second imaging rate; and transitioning the displaying rate of the plurality of image frames from a first displaying rate to a second displaying rate during a predetermined period, the predetermined period having a beginning or an end that occurs when the change between the first portion of the plurality of image frames and the second portion of the plurality of image frames is to occur.

16. The non-transitory computer-readable medium according to claim 15, the set of operations further comprising:

determining when a second change in the displaying rate of the plurality of image frames is to occur based on a second change between the first portion of the plurality of image frames having the first imaging rate and the second portion of the plurality of image frames having the second imaging rate; and transitioning the displaying rate of the plurality of image frames from the second displaying rate to the first displaying rate during a second predetermined period, the second predetermined period having a beginning or an end that occurs when the second change between the first portion of the plurality of image frames and the second portion of the plurality of image frames is to occur.

17. The non-transitory computer-readable medium according to claim 15, wherein the first portion is normally imaged frames and the first imaging rate is a normal imaging rate, and wherein the second portion is high-rate imaged frames and the second imaging rate is a rate higher than the normal imaging rate.

18. The non-transitory computer-readable medium according to claim 17, wherein transitioning the displaying rate of the plurality of image frames from the first displaying rate to the second displaying rate further includes thinning out the second portion of the plurality of image frames during the predetermined period having the beginning that occurs when the change between the first portion of the plurality of image frames and the second portion of the plurality of image frames is to occur.

19. The non-transitory computer-readable medium according to claim 17, wherein transitioning the displaying rate of the plurality of image frames from the first displaying rate to the second displaying rate further includes thickening the first portion of the plurality of image frames during the predetermined period having the end that occurs when the change between the first portion of the plurality of image frames and the second portion of the plurality of image frames is to occur.

20. The non-transitory computer-readable medium according to claim 17, wherein transitioning the displaying rate of the plurality of image frames from the first displaying rate to the second displaying rate further includes adjusting a value of a parameter specifying a frame rate for displaying the plurality of image frames.

* * * * *